(12) United States Patent
Artonne et al.

(10) Patent No.: US 8,016,426 B2
(45) Date of Patent: Sep. 13, 2011

(54) METHOD AND DEVICE FOR PROJECTING A PANORAMIC IMAGE WITH A VARIABLE RESOLUTION

(75) Inventors: Jean-Claude Artonne, Montreal (CA); Simon Thibault, Quebec (CA)

(73) Assignee: 6115187 Canada Inc., Saint-Laurent, Quebec (CA)

(*) Notice: Subject to any disclaimer, the term of this patent is extended or adjusted under 35 U.S.C. 154(b) by 759 days.

(21) Appl. No.: 12/038,257

(22) Filed: Feb. 27, 2008

(65) Prior Publication Data

US 2009/0213334 A1 Aug. 27, 2009

(51) Int. Cl.
*G03B 21/00* (2006.01)
*G03B 21/14* (2006.01)

(52) U.S. Cl. .............. 353/31; 353/69; 353/122

(58) Field of Classification Search ........ 353/30, 353/69–70, 77, 79, 121–122, 31; 359/435, 359/451, 641, 664, 708, 713–717; 345/698
See application file for complete search history.

(56) References Cited

U.S. PATENT DOCUMENTS

| | | | |
|---|---|---|---|
| 4,322,124 A | 3/1982 | Padgitt et al. | |
| 5,004,331 A | 4/1991 | Haseltine et al. | |
| 5,175,575 A * | 12/1992 | Gersuk | 353/94 |
| 5,347,398 A | 9/1994 | Debize | |
| 5,473,474 A | 12/1995 | Powell | |
| 5,500,747 A | 3/1996 | Tanide et al. | |
| 5,762,413 A * | 6/1998 | Colucci et al. | 353/122 |
| 6,115,193 A | 9/2000 | Shu | |
| 6,327,020 B1 * | 12/2001 | Iwata | 352/69 |
| 6,409,351 B1 * | 6/2002 | Ligon | 353/98 |
| 6,880,939 B2 | 4/2005 | Colucci et al. | |
| 6,905,218 B2 | 6/2005 | Courchesne | |
| 6,909,543 B2 * | 6/2005 | Lantz | 359/451 |
| 7,621,647 B1 * | 11/2009 | Colucci et al. | 353/121 |
| 7,719,563 B2 * | 5/2010 | Richards | 348/36 |
| 7,748,852 B2 * | 7/2010 | Nishigaki | 353/94 |
| 7,766,483 B2 * | 8/2010 | Balu et al. | 353/7 |
| 2004/0136092 A1 | 7/2004 | Artonne et al. | |
| 2004/0169726 A1 | 9/2004 | Moustier et al. | |

* cited by examiner

*Primary Examiner* — Tony Ko
*Assistant Examiner* — Jori S Reilly-Diakun
(74) *Attorney, Agent, or Firm* — Seed IP Law Group PLLC

(57) ABSTRACT

Embodiments include a method and apparatus for projecting a panoramic image, the method including steps of generating an image on an image generation surface, and then projecting the generated image on a projection surface to obtain a panoramic projected image, the points of the generated image being projected on the projection surface according to a non uniform distribution determined as a function of at least one parameter of a set comprising the shape of the generated image, the shape of the projection surface, and the position of an observation point of the projected image, in relation to the projection surface.

22 Claims, 6 Drawing Sheets

METHOD AND DEVICE FOR PROJECTING A PANORAMIC IMAGE WITH A VARIABLE RESOLUTION

TECHNICAL FIELD

The present invention relates to the projection of panoramic images. The present invention more particularly relates to the projection of panoramic images covering a sphere portion of at least 360°×140° using a single image projection optical device.

BACKGROUND

The systems of projection of panoramic images conventionally comprise a panoramic projection optical device comprising an image generation device, and a projection surface facing the optical device. The projection optical devices are generally designed to project on the projection surface a panoramic image generally having a field of view greater than 140°, while keeping a constant distribution of the pixels in the projected image. The projection optical devices consist for example of a digital projector comprising a plane active matrix for image generation.

The panoramic images are generally obtained using a panoramic objective of fisheye type having an angle of aperture of about 180°. Such a lens makes it possible to obtain an image having a circular shape.

FIG. 1 schematically shows the projection of a panoramic image. The figure shows a panoramic image 8 having a circular plane shape of center O and axes OX and OY, and a projection surface 2 which shape is for example substantially hemispherical. A projection optical device (not shown) allows the panoramic image 8 to be projected on the projection surface 2. In particular, the projection device projects each image point P of Cartesian coordinates (x, y) in the system OXY, on the projection surface 2 on a point P' of Cartesian coordinates (x', y', z') in a rectangular system O'X'Y'Z'. The origin O' of the system O'X'Y'Z' is for example located at the center of curvature of the projection surface 2, the axis O'Z' corresponding to the optical axis of the projection optical device.

The operation of the projection optical device may be modeled by a transfer function Fp giving for each image point P(x, y), the coordinates (x', y', z') of the point P' projected on the projection surface. In prior art, the aim was to avoid the projected image from comprising distortions, unpleasant for observers. To that end, the points P of the image generated are projected on the projection surface 2 according to a most linear possible dispersion as a function of the field angle θ (angle O'Z'—O'P') of the projected points P'.

In addition, the image generation devices usually have a plane image generation surface of rectangular shape, having a format which ratio may be 4/3 or 16/9. Consequently, the panoramic projection optical device can only project a disc inscribed in the image generation surface. The result is that all the pixels of the image generation surface located outside the inscribed disc are not projected on the projection surface.

In the panoramic projection systems with hemispherical projection screens, the projection optical device is usually located at the center of curvature of the hemispherical screen to obtain a constant distribution of the pixels of the projected image. The observers therefore cannot be also located at the center of curvature of the projection screen. Consequently, some projected points are nearer the observer than others. The result is that an observer cannot see all the pixels of the projected image with the same angular resolution.

BRIEF SUMMARY OF THE INVENTION

It is therefore proposed to provide an improved projection of panoramic images, so that the observer sees all the points of the projected image with a constant angular resolution.

It is also proposed to project a panoramic image on a projection surface which is not necessarily hemispherical, while keeping the angular resolution of the image seen by the observer constant. Thus, the projection surface may have the shape of a truncated hemisphere (different angular extension along the axes X' and Y') or an ellipsoid, or have plane faces linked between them by sharp edges, for example like vertical walls and a horizontal ceiling.

More globally, it is wished to improve the visual perception of the panoramic images projected by a panoramic projection system.

In one embodiment, a method for projecting a panoramic image is provided, comprising: generating an image on an image generation surface, and projecting the generated image on a projection surface, in order to obtain a panoramic projected image. According to one embodiment, the points of the generated image are projected on the projection surface according to a non uniform distribution determined as a function of at least one parameter of a set comprising the shape of the generated image, the shape of the projection surface, and the position of an observation point of the projected image, in relation to the projection surface.

According to one embodiment, the points of the generated image are projected on the projection surface with a uniform distribution, perceived from the observation point which is located outside a center of curvature of the projection surface.

According to one embodiment, the observation point is located on an optical axis according to which the projection is performed.

According to one embodiment, the position of the observation point in relation to the projection surface is determined in order to match a central position of an area occupied by several observers, or an average position susceptible of being occupied by one observer.

According to one embodiment, the method comprises digitally preprocessing of the image in order to modify the distribution of the pixels of the generated image.

According to one embodiment, a panoramic image projection device is also provided, comprising a device for generating an image on an image generation surface, an optical device for projecting the generated image on a projection surface, in order to obtain a panoramic projected image. According to one embodiment, the device is configured so that the points of the generated image are projected on the projection surface according to a non uniform distribution determined as a function of at least one parameter of a set comprising the shape of the generated image, the shape of the projection surface, and the position of an observation point of the projected image, in relation to the projection surface.

According to one embodiment, the device is configured to project the points of the generated image on the projection surface with a size defined by the following formula:

$$Dh(\theta) = k \cdot \sqrt{DO^2 + R^2 - 2 DO \cdot R\cos\theta}$$

where Dh is the size of a projected point or the distance between two adjacent projected points as a function of the field angle θ along a meridian of the projection surface, k is a constant, R is the radius of curvature of the projection surface, and DO is the distance between the center of an external projection lens of the optical device and the observation point.

According to one embodiment, the position of the observation point in relation to the projection surface is determined in order to match a central position of an area occupied by several observers, or an average position susceptible of being occupied by one observer.

According to one embodiment, the image generation surface has a rectangular shape, the device being configured to generate an image having a shape which surface is greater than that of a disc inscribed in the image generation surface.

According to one embodiment, the generated image has an elliptical shape inscribed in the image generation surface.

According to one embodiment, the image is projected using at least one anamorphic optical component.

According to one embodiment, the device is configured to project the generated image on the projection surface which shape is different from a hemispherical shape.

According to one embodiment, the device is configured to project the generated image on the projection surface having several faces linked between them by sharp edges.

According to one embodiment, the device is configured to project several images comprised in the generated image, on a respective face of the projection surface.

According to one embodiment, the device is configured to apply a digital preprocessing to the image in order to modify the distribution of the pixels of the generated image.

BRIEF DESCRIPTION OF THE SEVERAL VIEWS OF THE DRAWINGS

Example embodiments of the invention will be described below in relation with, but not limited to the appended figures wherein.

DETAILED DESCRIPTION

Figure 2:
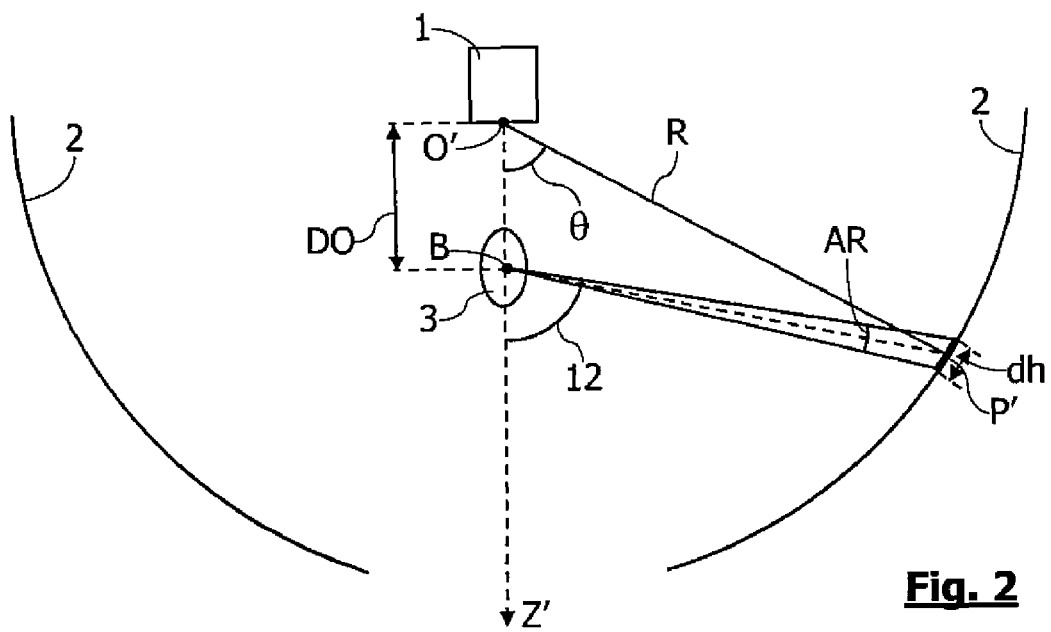

A first embodiment of a panoramic projection system is shown by FIG. 2. Very schematically, the system is configured to project on a projection surface 2 a plane panoramic image. The projection system comprises an optical device for projecting panoramic images 1, and a screen of substantially hemispherical shape 2, which center of curvature O' is located on the optical axis O'Z' of the projection optical device 1. An observer 3 is located at an observation point B on the optical axis O'Z', between the device 1 and the projection surface 2. The projection optical device 1 comprises an active matrix for image generation, for example of the type DMD (Digital Micromirror Device), LCD (Liquid Crystal Display), LCOS (Liquid Crystal On Silicon), GLV (Grating Light Valves), MEMS (Micromechanical System).

According to one embodiment, the optical device 1 is configured to project an image having an optimized resolution in which the points projected on the projection surface have a non uniform distribution, such that an observer located in a particular observation point, sees the projected points with a constant angular resolution AR. In other words, the size of each projected point P' (or the distance between two adjacent projected points on a meridian of the projection surface), divided by the distance BP' between the projected point P' and the observation point B of the observer 3, remains constant on the whole projection surface 2. As the distance BP' varies as a function of the field angle θ of the projected point, the size of the pixels varies with the angle θ.

Thus, the points P' projected by the projection optical device 1 verify the following relationship:

$$Dh(\theta) = k \cdot \sqrt{DO^2 + R^2 - 2 DO \cdot R\cos\theta} \qquad (1)$$

where Dh(θ) is the size of a projected point P' or the distance between two adjacent projected points as a function of the field angle along a meridian of the projection surface 2, k is a constant, R is the radius of curvature of the projection surface 2, and DO is the distance between the center O' of the external projection lens of the optical device 1 and the observation point B of the observer 3. The constant k can be calculated using the following formula in the case of a hemispherical projection on 180° (between −π/2 and +π/2):

$$k = \frac{\pi \cdot R}{\int_{-\pi/2}^{\pi/2} \sqrt{DO^2 + R^2 - 2 DO \cdot R\cos\theta}\, d\theta} \qquad (2)$$

If the relationship (1) is realized, the projected image has a substantially constant angular resolution. To satisfy the relationship (1), the projection optical device introduces, during the projection of the panoramic image, a distortion DS varying with the field angle θ, modeled by the following formula:

$$DS(\theta) = \left(\frac{Dh(0)}{Dh(\theta)} - 1\right) \cdot 100\% \qquad (3)$$

where Dh(0) is the size of the point of the projection surface corresponding to a zero angle θ, i.e., located on the optical axis.

The transfer function of a projection device supplies the relationship between the position of each point on the projection surface and the position of the corresponding pixel on the image generation surface. In the case of a panoramic projection projecting a circular source image, the transfer function may be of the form r=Fr(θ), knowing that on a circle of the projection surface corresponding to a constant field angle θ, the size of the projected pixels is constant. Now, if the relationship (1) is satisfied, the position of a pixel projected as a function of the position of the corresponding pixel on the image generation surface may be modeled by the following relationship:

$$\frac{r}{r\max} = \frac{Dh(\theta\max)}{Dh(\theta)} \cdot \frac{\theta}{\theta\max} \quad (4)$$

where θmax represents the maximum projection field angle. In a panoramic projection, the field angle θmax varies between 70° and 110°, and is generally 90°. The relationship (4) allows the transfer function Fr to be simply deduced:

$$r = Fr(\theta) = r\max \frac{Dh(\theta\max)}{Dh(\theta)} \cdot \frac{\theta}{\theta\max} \quad (5)$$

Figure 3:
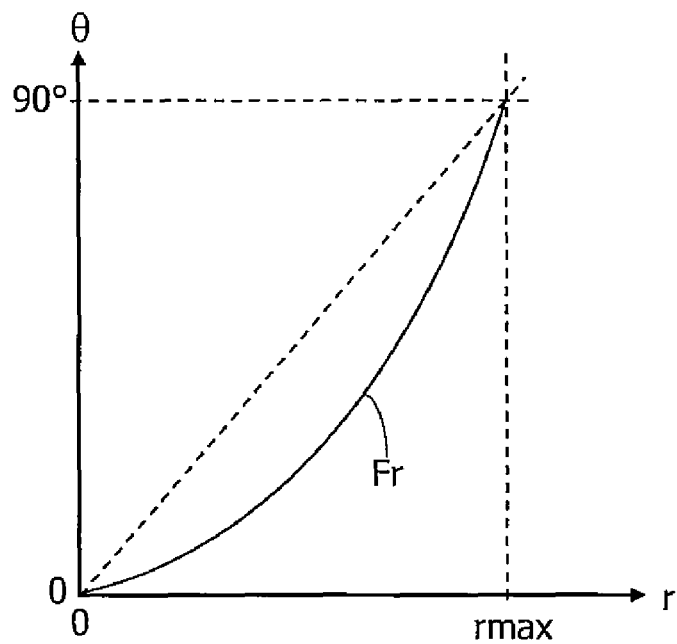
FIG. 3 shows in the form of a curve, optical properties of a panoramic projection system.

FIG. 3 shows the look of the function Fr for distributing the points of the projected image as a function of the position of the corresponding image points in the generated image 8. As this distribution function has a rotational symmetry around the optical axis O'Z', the position of an image point may be indicated by the distance r thereof with the center O of the image 8, rmax being the radius of the generated image. The position of a projected point P' may be defined by the field angle θ.

In prior art, the ideal shape of the function Fr is considered to be a straight line (shown in the figure in dotted line) between the points of coordinates (r=0, θ=0) and (r=rmax, θ=90°). With this ideal function, each image point is projected with a constant angular resolution. In the case where the relationship (1) is satisfied, the function Fr has the shape of a curve between the points (0, 0°) and (rmax, 90°), but which gradient is lower than of the ideal straight line near the point (0, 0°) and greater than that of the ideal straight line near the point (rmax, 90°). The result is that when the relationship (1) is satisfied, the resolution of a point projected near the optical axis O'Z' (θ near 0°) is greater than the resolution of a point projected near the edge of the projection surface (θ near 90°).

An optical design software application may then be used to generate a precise description of all the optical components of the projection optical device, so that it verifies the equation (4) or (5). To that end, such software application is usually input a merit function which can be deduced from the equation (4), as well as geometrical and optical features of the panoramic projection system, in particular in relation with the projection surface 2, and the generated image 8.

According to one embodiment, the relationship (1) may be more optimized to improve the observer comfort or guarantee a better compromise when the observer is located in a different position, or when several observers are present. Thus, the position of the observation point may be determined as a function of a central position of an area occupied by several observers or an average position susceptible of being occupied by an observer facing the projection surface. This optimization is obtained defining the value of the distance DO between the center O' of the external projection lens of the optical device 1 and the observation point B.

In an embodiment, a preprocess may be applied to the digital image before being displayed by the active matrix. The preprocess consists in redefining the position of each point r0 of the circular digital image in relation to the center of the image thanks to the following relationship:

$$\frac{r}{r\max} = \frac{Dh(\theta\max)}{Dh(\theta)} \cdot \frac{r0}{r0\max} \quad (6)$$

where r0max is the radius of the circular image, r is the position of the image point in the image thus preprocessed. The position r0 is defined by the following relationship:

$$\frac{r0}{r0\max} = \frac{\theta}{\theta\max} \quad (7)$$

The relationship (7) may be different, but panoramic images are generally obtained using a panoramic lens of fisheye type having an angle of aperture of about 180°. Such a lens makes it possible to obtain an image having a circular shape which transfer function Fr is linear. However, it is possible to artificially generate an image or by synthesizing several different images. In these cases, the relationship (7) may not be linear any more although it is usually always simpler to transform a hemispherical image into a plane circular image with linear distribution.

Figure 1:
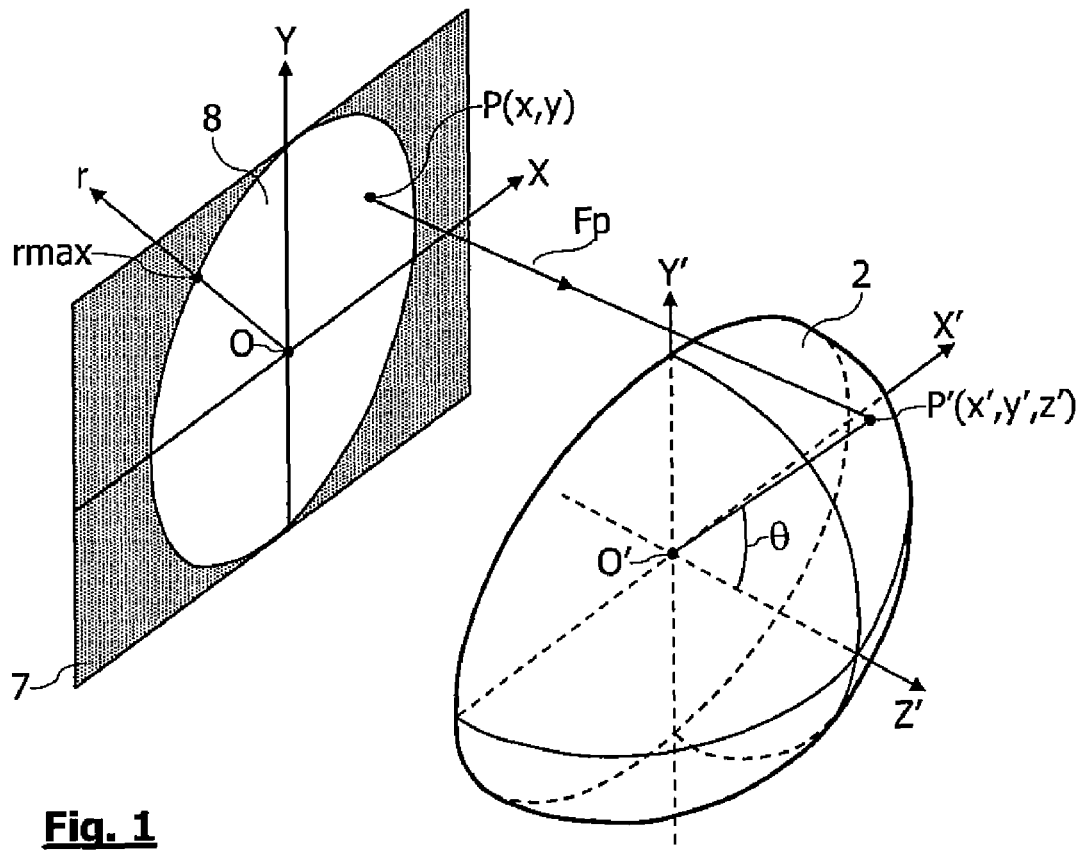
FIG. 1 previously described is a schematic diagram of a panoramic projection system, FIG. 2 schematically shows a panoramic projection system.
Figure 4:
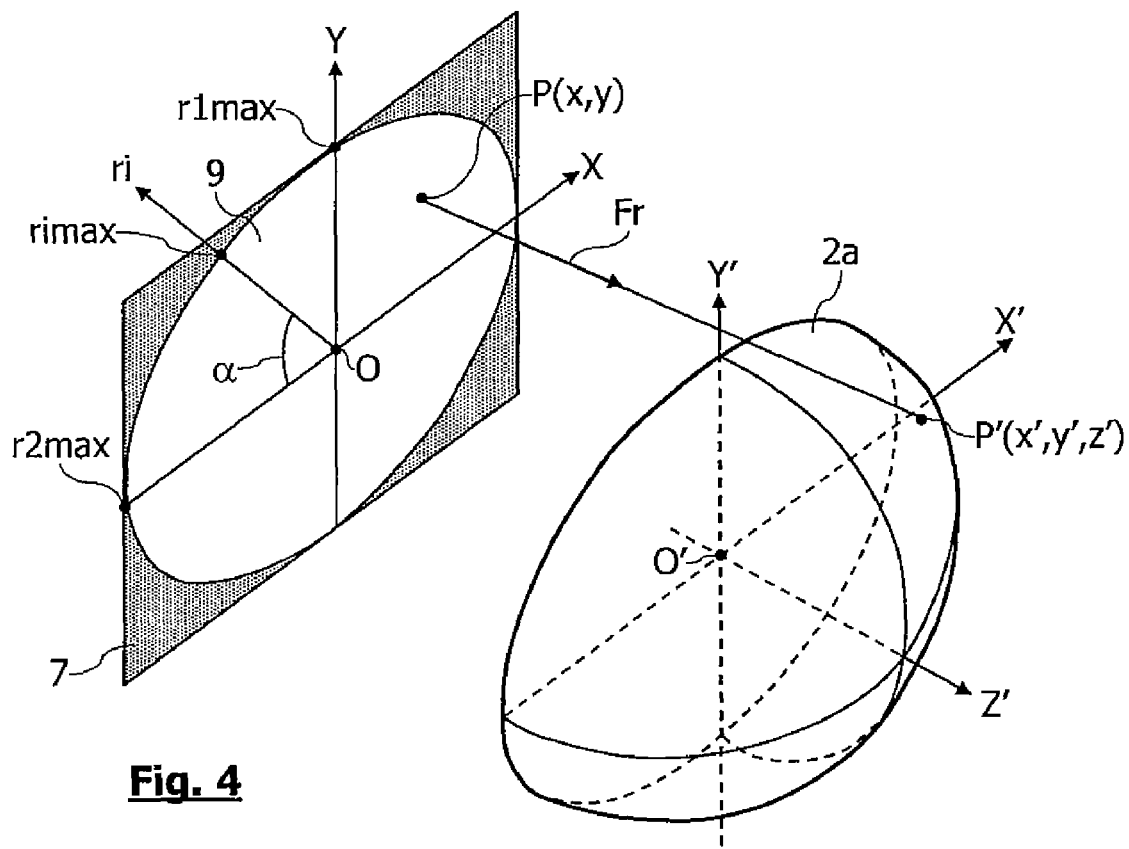
FIG. 4 is a schematic diagram of a panoramic projection system, according to one embodiment.

FIG. 4 very schematically shows another embodiment of the projection optical device. This embodiment varies from that of FIG. 2 in that the projection system is configured to generate on the image generation active matrix 7 an image 9 of elliptic shape which small and big axes are substantially equal to the width and length of the matrix 7, respectively. The projection optical device applies an inverse distortion to obtain a panoramic projected image without distortion on the projection surface 2a of substantially hemispherical shape. Thus, the image generation active matrix 7, generally of rectangular shape with a 4/3 length/width ratio, is more used (at 80%) than when the panoramic image generated is of circular shape (used at 59%). The result is that the number of projected pixels increases by about 30%, in relation to the system shown in FIG. 1.

Due to the elliptic shape of the generated image 9, the distribution function Fr of the projected points P' as a function of the position of the corresponding image points P, no longer has a rotational symmetry around the axis O'Z', but varies with both the distance r between the image point and the center O of the image and the angle α for example between the axis Ox and the radius passing by the considered point. Thus, the distribution function varies with the polar coordinates (r, α) of the image point P considered. If the image point P is located on the small axis of the ellipse 9, r varies between 0 and r1max. If it is located on the big axis of the ellipse 9, r varies between 0 and r2max, and if it is located outside the small and big axes r varies between 0 and rimax which is comprised between r1max and r2max.

According to one embodiment, the projection optical device of the system of FIG. 4 is configured to satisfy the relationship (1). The position of a pixel projected as a function of the position of the corresponding pixel on the image generation surface may be defined by the following relationship:

$$\frac{r}{ri\max} = \frac{Dh(\theta\max)}{Dh(\theta)} \cdot \frac{\theta}{\theta\max} \quad (8)$$

where rimax varies between r1max and r2max according to the radius of the ellipse 9 where the pixel considered of the image generation surface is located. The equation (5) allows the transfer function Fr of the projection optical device to be defined.

Figure 5:
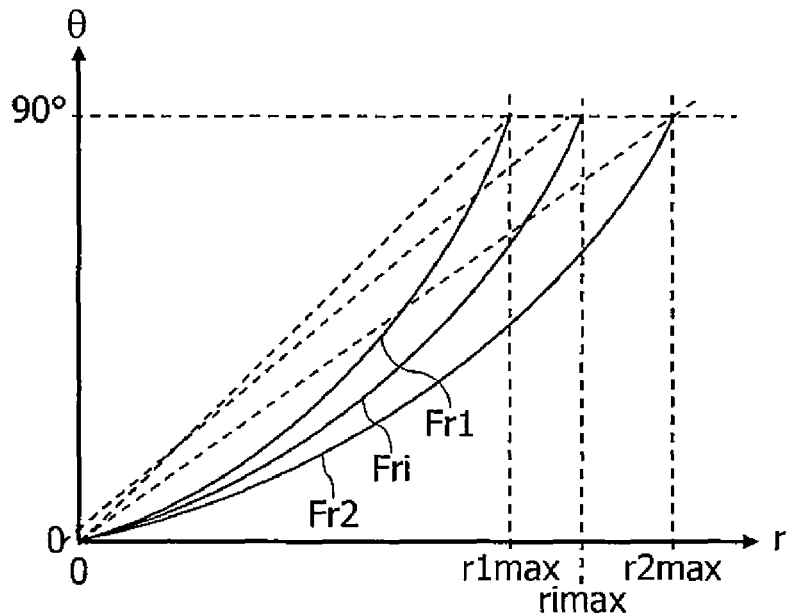
FIG. 5 shows in the form of curves, optical properties of the panoramic projection system of FIG. 4, FIG. 6 schematically shows an optical device for projecting a panoramic image.

FIG. 5 shows in the form of curves the look of distribution functions Fr1, Fri, Fr2 of the projected points as a function of the position of the corresponding image points in the generated image 9. The curves are shown on a graph comprising the distance r in abscissa and the field angle θ in ordinate. The curves vary between the origin point (0, 0°) and the final point (r1max, 90°) for Fr1, (rimax, 90°) for Fri and (r2max, 90°) for Fr2. The curve Fr1 is the function for distributing on the projection surface the points located on the small axis OY of the elliptic shape of the generated image 9, r1max corresponding to half the size of the small axis of the elliptic shape. The curve Fr2 is the function for distributing on the projection surface the points located on the big axis OX of the elliptic shape, r2max corresponding to half the size of the big axis of the elliptic shape. The curve Fri is the function for distributing on the projection surface the points located on any radius of the elliptic shape, intermediary between the small axis and the big axis, rimax corresponding to the length of the radius.

As in FIG. 3, the curves of the functions Fr1, Fri and Fr2 have a gradient lower than that of the ideal straight line near the point (0, 0°) and greater than that of the ideal straight line near the final point (r1max, 90°), (rimax, 90°) or (r2max, 90°). Thus, when the relationship (1) is satisfied, the resolution of a point projected near the optical axis O'Z' (field angle θ near 0°) is greater than the resolution of a point projected near the edge of the projection surface (θ near 90°).

That way, the angular resolution perceived from the observer 3 remains constant on a meridian of the projection surface 2a, but increases on an arc of circle of the projection surface centered on the axis O'Z', between the meridian corresponding to the projection of the small axis OY of the generated image 9, and the meridian corresponding to the projection of the big axis OX.

Figure 6:
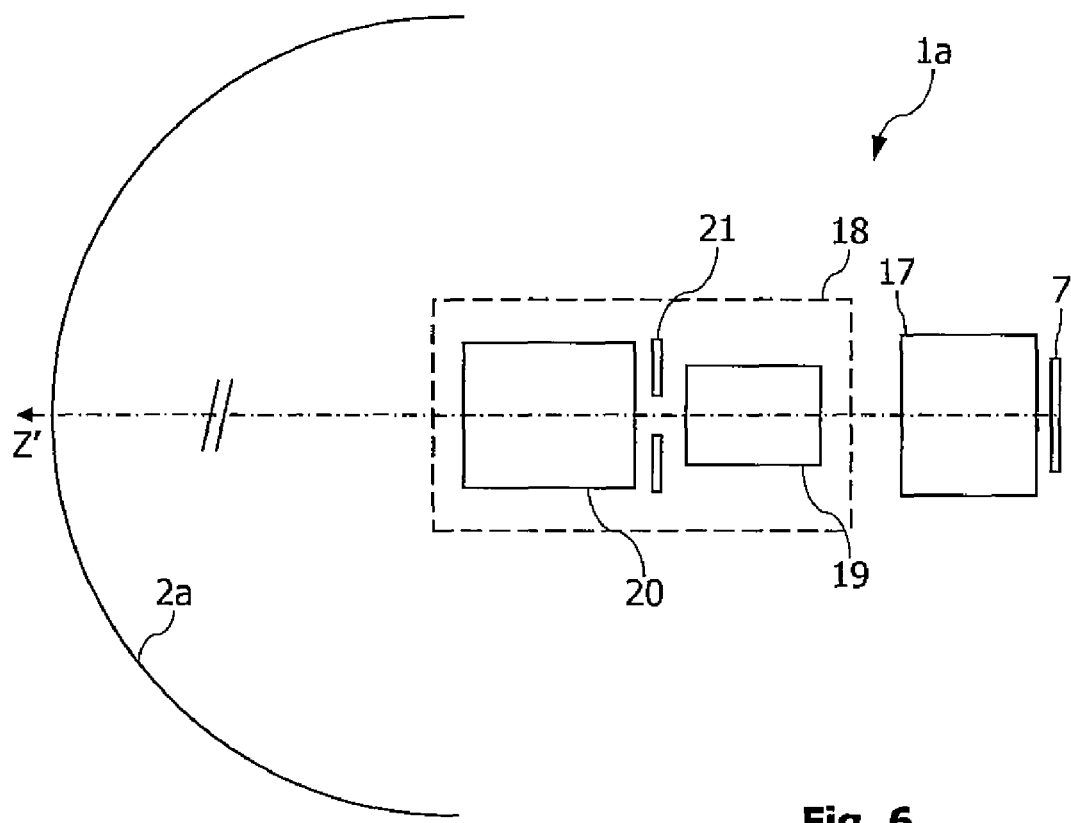

FIG. 6 schematically shows an embodiment of a panoramic projection optical device 1a. The device 1a is configured to project an image of elliptic shape on the projection surface 2a, of substantially hemispherical shape, while keeping the angular resolution of the projected image, perceived from a particular observation point. The device 1a is thus configured to respect the relationship (1).

The device 1a comprises an image generation matrix 7 which produces an image of elliptic shape, a prism 17, and a group of projection lenses 18. The group 18 introduces distortions in the projected image by projecting the image points P in projected points P' of variable size on the projection surface, so that an observer 3 in the position shown in FIG. 2 perceives these points with a constant resolution. It is to be noted that the prism 17 which is present on some models of projectors, may be suppressed and/or replaced by another optical device having similar functions.

To that end, the group of lenses 18 comprises an objective 19 facing the active matrix 7, an anamorphic wide-angle afocal telescope 20, and a pupil 21 arranged between the objective 19 and the telescope 20. The telescope 20 comprises spherical lenses and one or more cylindrical lenses producing two focal lengths having the same ratio as the image generation matrix 7, for example 4/3. The greater focal length is oriented according to the length of the matrix 7. The dimensions of the pupil 21 are optimized to match those of the output pupil of the objective 19, and thus maximize the light at the output of the objective 19, which is transmitted to the telescope 20. Thus, the pupil 21 may have an elliptic shape which dimensions may be variable to maintain the number-f of the group of lenses 18 constant. The pupil 21 may also be circular, which produces two numbers-f having the same ratio as the dimensions of the matrix 7.

Figure 7:
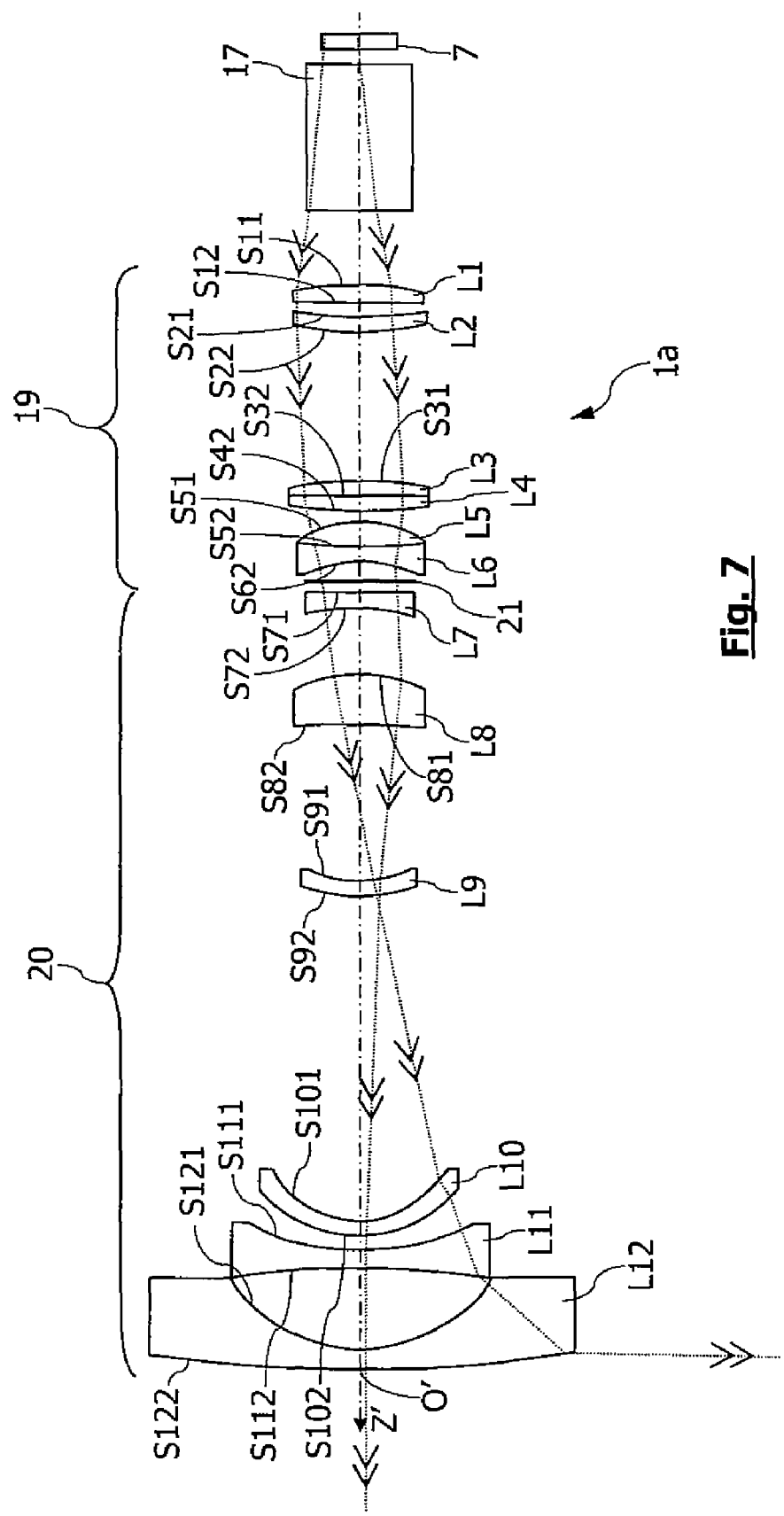
FIG. 7 shows an embodiment of the optical device for projecting a panoramic image.

FIG. 7 shows an embodiment of the optical device 1a of FIG. 6 optimized to satisfy the relationship (1).

The projection optical device is designed with a merit function defined to maximize the modulation on the projection surface at the cutoff frequency of the image generation matrix. In addition, the merit function is defined to respect the relationship (1) or the equation (6). Thus the position of a projected point belonging to the big axis of the ellipse 9 is defined by the equation (6) as a function of the field angle θ of the corresponding point on the projection surface with rimax=r2max. Likewise, the position of a projected point belonging to the small axis of the ellipse 9 is defined by the equation (6) with rimax=r1max. This condition makes it possible to optimize the anamorphose in a 4/3 ratio, and to obtain an image to be projected of elliptic shape 9. The optical device 1a thus allows an elliptic image having a 4/3 ratio between the big axis and the small axis of the image to be projected on the projection surface of hemispherical shape.

In FIG. 7, the objective 19 comprises six lenses L1-L6 with spherical faces centered on the optical axis O'Z'. The lens L1 facing the prism 17, comprises a convex proximal face S11 and a concave distal face S12. The lens L2 comprises a concave proximal face S21 and a convex distal face S22. The lens L3 comprises a convex proximal face S31 and a convex distal face S32. The lens L4 is arranged against the lens L3 and therefore comprises a proximal face joined to the distal face S32 of the lens L3, and a convex distal face S42. The lens L5 comprises a convex proximal face S51 and a convex distal face S52. The lens L6 comprises a proximal face joined to the distal face S52 of the lens L5, and a convex distal face S62.

The telescope 20 comprises six lenses L7-L12. The lens L7 facing the pupil 21 comprises a convex cylindrical proximal face S71 (facing the pupil 21), and a concave spherical distal face S72. The lens L8 comprises a convex spherical proximal face S81 and a concave spherical distal face S82. The lens L9 has a concave spherical proximal face S91 and a convex cylindrical distal face S92. The lens L10 comprises a concave spherical proximal face S101 and a convex spherical distal face S102. The lens L11 comprises a concave spherical proximal face S111 and concave spherical distal face S112. The lens L12 comprises a concave spherical proximal face S121 and a convex spherical distal face S122.

The detailed features of an embodiment of the optical device 1a are supplied in table 1 below, giving for each component of the optical device the shape (or that of the faces thereof), the radius of curvature (or that of the faces thereof), the thickness and the distance in relation to the following component, the diameter and the type of glass of which it is made.

TABLE 1

| Ref. | Ref. | Surface Shape | Radius of curvature (mm) | Thickness (e)/ Distance (d) (mm) | Diameter (mm) | Type of glass |
|---|---|---|---|---|---|---|
| 22 | | Hemispherical | 4000.00 | d: 4000.0 | 0 | |
| L12 | S122 | Spherical | 348.65 | e: 4.8 | 101 | BAL11 |
| | S121 | Spherical | 38.96 | d: 19.3 | 63 | |
| L11 | S112 | Spherical | −197.00 | e: 3.7 | 62 | P-SK57 |
| | S111 | Spherical | 53.51 | d: 4.0 | 52 | |
| L10 | S102 | Spherical | 30.43 | e: 3.6 | 47 | BSM14 |
| | S101 | Spherical | 23.88 | d: 76.9 | 42 | |
| L9 | S92 | Cylindrical | 50.32/∞ | e: 3.8 | 27 | S-LAL59 |
| | S91 | Spherical | 30.31 | d: 36.9 | 26 | |
| L8 | S82 | Spherical | −135.96 | e: 11.8 | 29 | SF53 |
| | S81 | Spherical | −34.50 | d: 15.9 | 30 | |
| L7 | S72 | Spherical | −60.83 | e: 3.8 | 26 | BAL7 |
| | S71 | Cylindrical | ∞/−240.2 | d: 2.5 | 26 | |
| 21 | | Plan | — | e: 4.2 | 26 | |
| L6 | S62 | Spherical | −29.77 | e: 3.7 | 26 | PBH55 |
| L5 | S52 | Spherical | 182.28 | e: 5.5 | 30 | SSK4A |
| | S51 | Spherical | −30.51 | d: 2.6 | 30 | |

TABLE 1-continued

| Ref. | Surface Ref. | Surface Shape | Radius of curvature (mm) | Thickness (e)/ Distance (d) (mm) | Diameter (mm) | Type of glass |
|---|---|---|---|---|---|---|
| L4 | S42 | Spherical | 87.73 | e: 3.6 | 33 | S-BSM4 |
| L3 | S32 | Spherical | 919.88 | e: 3.9 | 33 | LAL11 |
|  | S31 | Spherical | −114.47 | d: 35.7 | 33 |  |
| L2 | S22 | Spherical | 84.29 | e: 3.8 | 32 | S-BSM9 |
|  | S21 | Spherical | 244.26 | d: 2.6 | 31 |  |
| L1 | S12 | Spherical | −3055.24 | e: 4.5 | 31 | L-BAL35 |
|  | S11 | Spherical | −60.00 | d: 17.0 | 31 |  |
| 17 |  | Prism | — | e: 35.0 | 25 | BK7 |
| 16 |  | Plan | — | d: 8.0 | 19 |  |
| 7 |  | Plan | — |  | 18 |  |

The features of the optical device specified in table 1 may be obtained using an optical design software package like Zemax or CodeV, from the following input data. The observation point B is located at a distance D0=0.1×R of the projection device. The radius of curvature R of the hemispherical projection surface is equal to 4 m. The image generation active matrix 7 has a size of 19.11 mm×14.33 mm and a resolution of 1400×1050 pixels (SXGA+) in color. The spectral weight for optimization is unitary to the three main wavelengths 486 nm, 588 nm and 656 nm. The working f-number is maintained at 3.0. The maximum value θmax of the field angle θ is 90°. The merit function supplied to the optical design software package is defined to maximize the modulation on the projection surface at the cutoff frequency of the image generation matrix. In addition, the merit function is defined to respect the relationship (1) or the equation (6), the ratio between the length of the big axis and the small axis of the projected image of elliptic shape being equal to 4/3.

Figure 8:
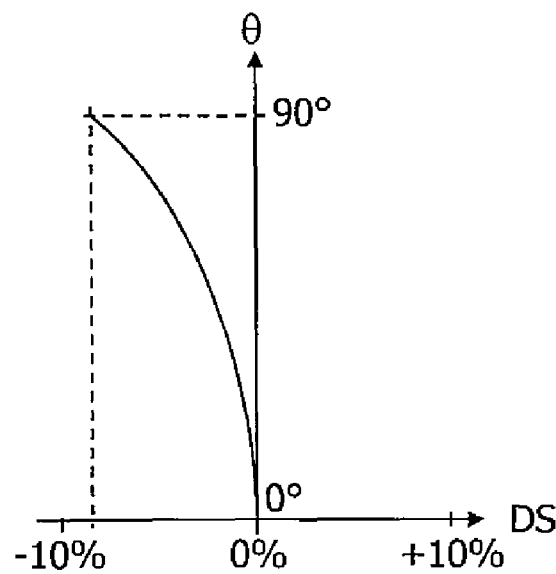
FIG. 8 shows a distortion curve of the projection optical device of FIG. 7.

FIG. 8 shows a curve giving the distortion DS as a function of the field angle θ, introduced into the image projected by the projection optical device of FIG. 7. In FIG. 8, there is no distortion DS when θ is equal to 0 and progressively reaches a value substantially equal to 8.9% when θ is equal to 90°. Contrary to what is usually desired when designing an optical device, the projection optical device 1a is configured to voluntarily introduce distortions into the projected image 9.

Admittedly, the optical projection device may alternately be made with diffractive and/or reflective and/or aspherical and/or toroidal, etc. surfaces.

It is also possible to replace all or some elements 19, 20 and 21 by different combinations of optical groups having different individual functions, but allowing the same result to be reached. It is also possible to obtain this result by means of several optical systems in cascade, each having different functions creating one or more intermediary real or virtual images.

The definition of the nature, the shapes and the arrangement of these optical components to reach a particular distribution of the projected points is within the reach of those skilled in the art who have an optical design software package.

In the case of a generated image of elliptic type 9, a pre-process may also be applied to the image before it is displayed by the active matrix 7. For an image of elliptic shape, the relationship (6) becomes:

$$\frac{r}{r_{i}\max} = \frac{Dh(\theta\max)}{Dh(\theta)} \cdot \frac{r0}{r0\max}. \tag{9}$$

Figure 9:
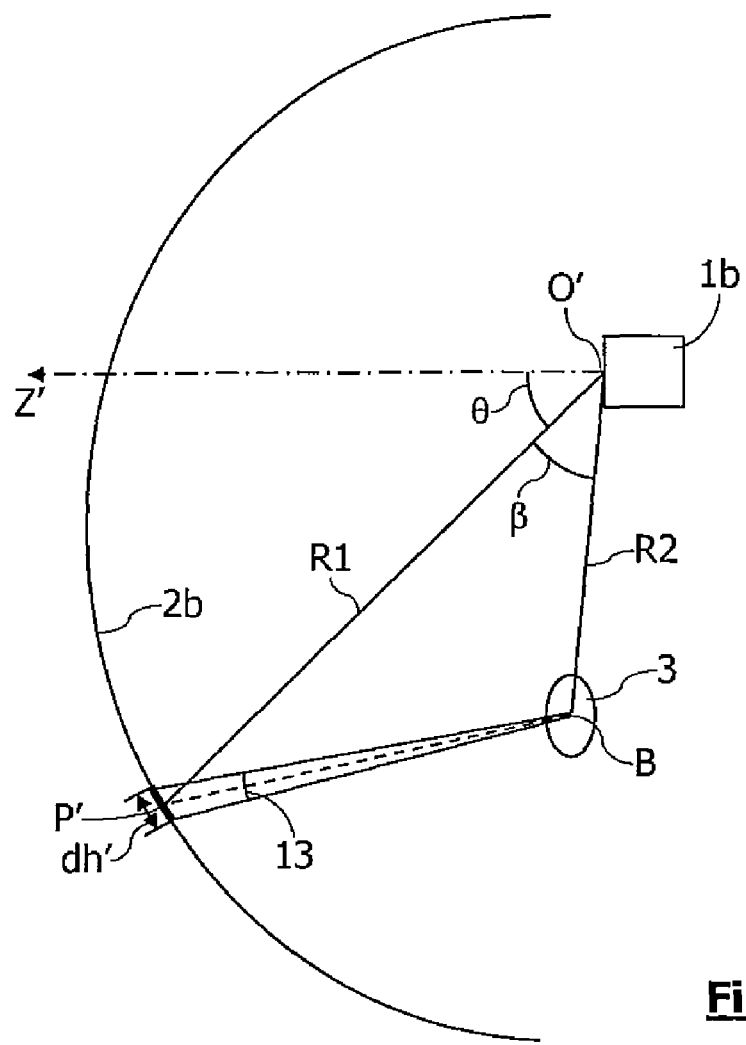
FIG. 9 is a schematic diagram of a panoramic projection system, according to another embodiment.
Figure 10:
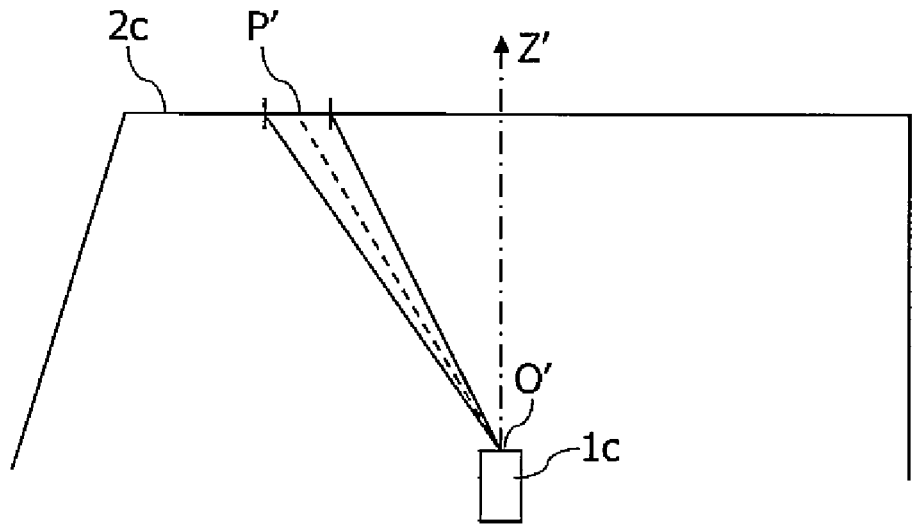
FIG. 10 is a schematic diagram of a panoramic projection system, according to another embodiment.

FIG. 9 shows another embodiment of a panoramic projection system. The system comprises a projection optical device 1b and a projection surface 2b. The system varies from those previously described and shown by FIGS. 2 to 7, in that the observer may be located in an observation point B located outside the optical axis O'Z' of the projection optical device 1b, and the projection surface 2b is not necessarily hemispherical. In this embodiment, it is wished to improve the visual perception of the projected image at the observation point B. To that end, the optical device 1b is configured so that the image generated by the image generation active matrix 7 is projected with an angular resolution of the projected points P', constant on the whole projection surface 2b, perceived from the particular observation point B. The result is that the size Dh' of a projected point P' divided by the distance BP' between the observation point B and the point P' is kept constant on the whole projection surface 2b. This condition may be written as follows:

$$Dh' = k1 \cdot \sqrt{|\overrightarrow{O'A}|^2 + |\overrightarrow{O'P'}|^2 - 2\overrightarrow{O'A} \cdot \overrightarrow{O'P'}} \tag{10}$$

where k1 is a constant that may be defined by the limit conditions, the term in square root representing the distance between the observer 3 and the projected point P'. The relationship (7) is equivalent to the following relationship:

$$Dh' = k1 \cdot \sqrt{R1^2 + R2^2 - 2R1 \cdot R2\cos\beta} \tag{11}$$

where R1 and R2 are the distances between the point O' and the points P' and B respectively, and α is the angle (P'O'B).

If the relationship (10) (or (11)) is satisfied by the projection optical device 1b, the observer may observe at the observation point B an image on the projection surface 2b which observed resolution is substantially constant.

The equations (10) or (11) may be used to define a new set of relationships (3) and (4) (or (5)), thus allowing transfer functions to be defined between the distribution of the corresponding image points in the generated image 8, 9 as a function of the points of the projected image.

The position B of the observer in front of the projection surface 2b may correspond to the more usual position, or the average position occupied by one or more observers, or the central position of an area occupied by several users.

In an embodiment, the image generated on the matrix 7 has, as shown by FIG. 4, an elliptic shape in order to occupy as much as possible the matrix surface, and thus increase the number of pixels projected from the matrix surface on the projection surface 2b. The projection device 1b is then configured to keep the angular resolution constant, perceived from a particular observation point, of the points of the image projected along a meridian (passing through a point of the optical axis O'Z') of the projection device 1b.

FIG. 9 shows another embodiment. In this embodiment, the projection system comprises a projection optical device 1c and a projection surface 2c having several plane or curved faces, linked between them by sharp edges, like the angles of a room comprising walls and a ceiling. As the distance between the distal lens of the optical device 1c and the projection surface 2c varies, the projection device is configured to take into account the shape of the projection surface and the position of the distal projection lens in relation to the projection surface, to allocate a determined angular resolution to each projected point of the surface P'.

In another embodiment, the projection device 1c is configured to keep constant the angular resolution of the projected image, perceived from a particular observation point. Here again, the transfer function of the projection device may be defined using the equations (10) or (11), to which it is advisable to add a mathematical model of the projection surface 1c.

In another embodiment, the image generation matrix 7 generates an image of elliptic shape which big and small axes respectively correspond to the length and width of the matrix 7. The projection device 1c is configured to keep constant the angular resolution, perceived from a particular observation point, of the points of the image projected along a meridian (passing through a point of the optical axis O'Z') of the projection surface 2c.

In an embodiment, each (plane or curved) face of the projection surface 2c is used to project a distinct, not distorted image. Thus, the projection system may be used to simultaneously project several images formed in a panoramic image.

Contrary to what is usually desired when designing an optical device, the projection optical devices 1, 1a-1c previously described are configured to voluntarily introduce into the projected image 9 distortions which are defined as a function of a particular optical effect.

It will be clear to those skilled in the art that the present invention is susceptible of various embodiments and applications. In particular, the invention is not limited to a particular projection optical device, but covers any projection device allowing a projected image which points are not uniformly distributed to be obtained on the projection surface. It is indeed within the reach of those skilled in the art to design and manufacture an optical device from data detailing a distribution of each image point supplied by the optical device as a function of the position of the corresponding object point (which image supplied by the device is the image point considered).

The present invention is not limited either to the projection of an image of circular or elliptic shape. Indeed, other shapes may be provided to optimize the use of the image generation active matrix. In addition, the generated image may be inscribed in the active matrix or truncated in order to cover a bigger part of the active matrix or the whole active matrix.

The projection optical device may then be adapted to the shape of the generated image to optimize the angular resolution of the projected image, i.e., optimize the size of each projected point, as a function of the particular visual effect wanted. In addition, it may be provided to perform, by digital processing means, preprocesses for distorting the image so as to obtain the effects wanted particularly in relation with the distribution of the points of the projected image, before generating the image to be projected on the active matrix. This arrangement may allow in particular flexibility to be introduced in the use of the projection optical device, and thus to make it more easily adaptable to a shape of projection surface or a change of position in relation to the projection surface.

It may also be considered to inverse the projection optical device previously described to use it in a wide-angle image capture system supplying images which pixels have a non linear distribution.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for projecting a panoramic image comprising:
   generating an image for projection on an image generation surface,
   modifying the generated image, prior to projecting the generated image on a projection surface, to obtain a panoramic projected image having an angular resolution, seen from a particular observation point located outside a center of curvature of the projection surface, which is constant on the whole projection surface, the modification of the generated image being a function of at least one parameter of a set comprising the shape of the generated image on the image generation surface, the shape of the projection surface, and the position of the observation point in relation to the projection surface, and
   projecting the modified generated image on the projection surface to obtain the panoramic projected image.

2. The method according to claim 1, wherein the observation point is located on an optical axis according to which the projection is performed.

3. The method according to claim 2, wherein the points of the generated image projected on the projection surface have a size defined by the following formula:

$$Dh(\theta) = k \cdot \sqrt{DO^2 + R^2 - 2 DO \cdot R\cos\theta}$$

where $Dh(\theta)$ is the size of a projected point or the distance between two adjacent projected points as a function of the field angle $\theta$ along a meridian of the projection surface, k is a constant, R is the radius of curvature of the projection surface, and DO is the distance between the center of an external projection lens and the observation point.

4. The method according to claim 1, wherein the position of the observation point in relation to the projection surface is determined in order to match a central position of an area occupied by several observers, or an average position susceptible of being occupied by one observer.

5. The method according to claim 1, wherein the image generation surface has a rectangular shape, the generated image having a shape which surface is greater than that of a disc inscribed in the image generation surface.

6. The method according to claim 5, wherein the generated image has an elliptical shape inscribed in the image generation surface.

7. The method according to claim 1, wherein the projection surface has a shape different from a hemispherical shape.

8. The method according to claim 1, wherein the projection surface has several faces linked between them by sharp edges.

9. The method according to claim 8, wherein the projected image comprises several images, each being projected on a respective face of the projection surface.

10. The method according to claim 1, comprising digitally preprocessing the image in order to modify the distribution of the pixels of the generated image.

11. The method according to claim 1, wherein the image is projected using at least one anamorphic optical component.

12. A device for projecting a panoramic image, comprising:
a device for generating an image on a plane image generation surface; and
an optical projection device for projecting the generated image on a projection surface, to obtain a panoramic projected image, the projection device being configured so that an angular resolution of the panoramic image projected on the projection surface, seen from a particular observation point located outside a center of curvature of the projection surface, is constant on the whole projection surface, the optical projection device being configured as a function of at least one parameter of a set comprising the shape of the generated image on the image generation surface, the shape of the projection surface, and the position of the observation point in relation to the projection surface.

13. The device according to claim 12, wherein the observation point is located on an optical axis according to which the projection is performed.

14. The device according to claim 13, configured to project the points of the generated image on the projection surface with a size defined by the following formula:

$$Dh(\theta) = k \cdot \sqrt{DO^2 + R^2 - 2DO \cdot R\cos\theta}$$

where $Dh(\theta)$ is the size of a projected point or the distance between two adjacent projected points as a function of the field angle $\theta$ along a meridian of the projection surface, k is a constant, R is the radius of curvature of the projection surface, and DO is the distance between the center of an external projection lens of the optical device and the observation point.

15. The device according to claim 12, wherein the position of the observation point in relation to the projection surface is determined in order to match a central position of an area occupied by several observers, or an average position susceptible of being occupied by one observer.

16. The device according to claim 12, wherein the image generation surface has a rectangular shape, the device being configured to generate an image having a shape which surface is greater than that of a disc inscribed in the image generation surface.

17. The device according to claim 16, wherein the generated image has an elliptical shape inscribed in the image generation surface.

18. The device according to claim 12, wherein the optical projection device comprises at least one anamorphic optical component.

19. The device according to claim 12, configured to project the generated image on the projection surface which shape is different from a hemispherical shape.

20. The device according to claim 12, configured to project the generated image on the projection surface having several faces linked between them by sharp edges.

21. The device according to claim 20, configured to project several images comprised in the generated image, on a respective face of the projection surface.

22. The device according to claim 12, configured to apply a digital preprocessing to the image in order to modify the distribution of the pixels of the generated image.

* * * * *